US012450487B2

(12) United States Patent  
Edwards et al.

(10) Patent No.: US 12,450,487 B2  
(45) Date of Patent: Oct. 21, 2025

(54) ARTIFICIAL INTELLIGENCE-BASED PERSONALIZED FINANCIAL RECOMMENDATION ASSISTANT SYSTEM AND METHOD

(71) Applicant: 10353744 Canada Ltd., Kitchener (CA)

(72) Inventors: Marcus Edwards, Waterloo (CA); Mark Church, Waterloo (CA)

(73) Assignee: 10353744 Canada Ltd., Kitchener (CA)

( * ) Notice: Subject to any disclaimer, the term of this patent is extended or adjusted under 35 U.S.C. 154(b) by 1123 days.

(21) Appl. No.: 17/214,372

(22) Filed: Mar. 26, 2021

(65) Prior Publication Data

US 2021/0303973 A1     Sep. 30, 2021

Related U.S. Application Data

(60) Provisional application No. 63/000,167, filed on Mar. 26, 2020.

(51) Int. Cl.
*G06N 3/082*     (2023.01)
*G06F 18/21*     (2023.01)
(Continued)

(52) U.S. Cl.
CPC ......... *G06N 3/082* (2013.01); *G06F 18/2178* (2023.01); *G06N 3/045* (2023.01); *G06N 3/08* (2013.01); *G06N 5/04* (2013.01)

(58) Field of Classification Search
CPC .......... G06N 3/082; G06N 3/045; G06N 3/08; G06N 5/04; G06F 18/2178; G06F 18/214; G06F 18/24133; G06F 18/40
See application file for complete search history.

(56) References Cited

U.S. PATENT DOCUMENTS 7,818,233 B1 *  10/2010   Sloan ............... G06Q 20/10
                                                          705/37
10,990,881 B1 *  4/2021   Osmak ............... G06N 5/02
(Continued)

FOREIGN PATENT DOCUMENTS

TR            201819661 A2       4/2019

OTHER PUBLICATIONS

Shalom, Oren Sar, Guy Uziel, and Amir Kantor. "A generative model for review-based recommendations." Proceedings of the 13th ACM conference on recommender systems. 2019. (Year: 2019).*

(Continued)

*Primary Examiner* — Brent Johnston Hoover
(74) *Attorney, Agent, or Firm* — Own Innovation Inc.; James W. Hinton

(57) ABSTRACT

Provided are a computer system and method for generating and providing intelligent recommendations using artificial intelligence ("AI"). The system includes a memory for storing user feedback data, user resource data, and user goal data, and a processor in communication with the memory. The processor is configured to execute a first AI model for user interface ("UI") effectiveness optimization, a second AI model for transaction optimization, a model mapping module configured to implement a functional mapping between the first AI model and the second AI model through which the first AI model and second AI model communicate and mutually update each other, and a user interface generator module for generating a user interface for outputting the intelligent recommendations and receiving the user feedback data.

19 Claims, 8 Drawing Sheets

(51) Int. Cl.
    *G06N 3/045*      (2023.01)
    *G06N 3/08*      (2023.01)
    *G06N 5/04*      (2023.01)

(56) References Cited

U.S. PATENT DOCUMENTS

| | | | |
|---|---|---|---|
| 2005/0054381 A1 | 3/2005 | Lee et al. | |
| 2021/0012190 A1* | 1/2021 | Murali | G06Q 10/04 |
| 2021/0073293 A1* | 3/2021 | Fenton | H04L 51/08 |
| 2021/0264520 A1* | 8/2021 | Cummings | G06Q 40/12 |

OTHER PUBLICATIONS

Canadian Intellectual Property Office, Office Action for CA Patent App. No. 3,113,332, Oct. 20, 2023.

Canadian Intellectual Property Office, Office Action for CA Patent App. No. 3,113,332, May 4, 2023.

https://hackernoon.com/how-to-keep-your-machine-learning-models-up-to-date- vd5z3yzw, Mar. 12, 2020 (Dec. 3, 2020)[retrieved on Oct. 12, 2023].

N. Rathnayake, et al., "A Framework for Adaptive User Interface Generation based on User Behavioural Patterns", 2019 Moratuwa Engineering Research Conference (MERCon), Moratuwa, Sri Lanka, pp. 698-703, doi:10.1109/MERCon.2019.881825, Aug. 29, 2019.

\* cited by examiner

ARTIFICIAL INTELLIGENCE-BASED PERSONALIZED FINANCIAL RECOMMENDATION ASSISTANT SYSTEM AND METHOD

TECHNICAL FIELD

The following relates generally to intelligent recommendation systems, and more particularly to systems and methods for providing personalized recommendations for users of resource management software systems such as online, desktop or mobile banking applications.

INTRODUCTION

Financial management software systems provide intuitive interfaces to their users. Interactions with an interface can generate analytic data which can be used to evaluate the effectiveness of the components of the interface.

Preference-based recommendation systems differentiate between users and items of interest using historical analytic data. Neural-network-based preference recommendation systems incorporate data relating pluralities of users and items of interest into their many-to-many relational structures. In such systems, many user and item relationships need to be incorporated into a growing neural network quickly and in near real-time.

Financial recommendation systems may consider users' financial data and financial market data in their recommendation generation algorithms.

Financial recommendation systems which take into account the user-specific particulars of interface design effectiveness do not exist in prior art. Intelligent interface design which takes into account the particular meanings of words, colours, and other arbitrary attributes of interface elements to specific users would embody a new instance of code generation algorithm. To implement such an adaptive code generation algorithm as a component of the presentation layer in most settings is an unnecessary and expensive endeavour. However, with the growing number and quality of interfaces through which a person can make financial decisions (e.g. Amazon Alexa, Google Home, Third party banking apps, Open Banking APIs) there is now a need for a greater ability to communicate the meaning and impact of financial decisions to users.

There is also a need to unify the user experience across these interfaces when it comes to important decisions. If, for example, a user would see a large red button with a flashing warning in a graphical user interface, then there should be an analogous indicator communicated by the voice of an audio assistant device when they make the same decision with their voice. It is clear that how each user will respond to language and tone is greatly variable. There is also significant variation in the effectiveness of graphical user interfaces across different user groups, as evidenced by the multiplicity and popularity of analytics tools such as Google Analytics, which provide feedback on the quality of each user's interactions but do not provide any mechanism for tying that data back into the UI generation.

The prior art lacks approaches that combine the task of user interface effectiveness optimization and financial workflow optimization in such a way that behaviours learned from a user's interactions with both the interface and financial situations are used to inform the structure of each. This means that the prior art does not take advantage of user-specific optimizations that can be captured by a continually-training AI observing the user's behaviour.

Accordingly, there is a need for an improved intelligent recommendation system and method that overcomes at least some of the disadvantages of existing systems and methods.

SUMMARY

An object of the present invention is to provide a computer system for generating and providing intelligent recommendations using artificial intelligence ("AI") and related systems and methods.

A computer system for generating and providing intelligent recommendations using artificial intelligence ("AI") is provided. The system includes a memory for storing user feedback data, user resource data, and user goal data and a processor in communication with the memory. The processor is configured to execute a first AI model for user interface ("UI") effectiveness optimization, a second AI model for transaction optimization, a model mapping module configured to implement a functional mapping between the first AI model and the second AI model through which the first AI model and second AI model communicate and mutually update each other, and a user interface generator module for generating a user interface for outputting the intelligent recommendations and receiving the user feedback data.

The first and second AI models may be neural networks.

Constraints of each AI model whose data inputs belong to one data domain may be learned by the other AI model that processes data in another separate domain.

The first AI model may be a generative code effectiveness learning model.

The first AI model may include a convolutional neural network architecture.

Elements of the UI may be presented in any one or more of a graphical, text-based, and audio format.

The code effectiveness learning model may be trained as generated UIs are interacted with via the user feedback data and as the second AI model is trained.

The processor may be further configured to execute a model swapping module for replacing the first AI model with a standby AI model during operation.

The processor may be further configured to execute a model swapping module for replacing the second AI model with a standby AI model during operation.

In subsequent workflow generation procedures, the output of the UI generator module may be made of UI attributes that satisfy the code effectiveness learning model's conditions for effectiveness in a given scenario.

A method for generating and providing an intelligent recommendation using artificial intelligence ("AI") is provided. The method includes receiving user feedback data, user resource data representing user resources, and user goal data representing user goals, generating a user interface ("UI") to interact with the user, optimizing the user interface using a first AI model, optimizing transactions of the user using a second AI model, implementing a functional mapping between the first AI model and the second AI model through which the first AI model and second AI model communicate and mutually update each other, and outputting the intelligent recommendation via the user interface.

The method may further include modelling, via the second AI model, future changes in a state of a user's initial financial assets.

The method may further include generating and presenting a suggestion in the UI preemptively to advise the user about a possible transaction.

The method may further include generating and presenting a suggestion in response to an impending transaction that affects the user resources that the second AI model identifies as useful for the user goals.

The method may further include selecting the recommendation by extracting weights from the second AI model, mapping edges and nodes to workflow steps and decisions, and organizing the edges and nodes in an order reflected by a depth of the nodes in the second AI model.

The method may further include swapping the first AI model for a standby AI model during operation.

The method may further include swapping the second AI model with a standby AI model during operation.

A computer system for generating and providing intelligent recommendations using artificial intelligence ("AI") is provided. The system includes a memory for storing user feedback data, user financial assets data, and user financial goal data, and a processor in communication with the memory. The processor is configured to execute a first AI model for choosing how to present an element of a user interface graphically, a second AI model for selecting an optimum strategy for a particular user to achieve a financial goal, and a user interface generator module for generating a user interface for outputting the intelligent recommendations and receiving the user feedback data. The first AI model and the second AI model communicate and mutually update each other through a functional mapping.

Each of the first AI model and the second AI model may include a neural network.

The first AI model may include a convolutional neural network, and the second AI model may include a feedforward neural network.

A computer-implemented method of recommending an advisability of an entity's action is also provided. The method includes collecting information about goals of the entity considering the action, encoding the goals in a weighted matrix, collecting information about past behaviour of the entity considering the action, calculating a consistency of the action with attainment of the goals, and outputting the advisability of the action to the entity considering the action.

The outputting may include displaying the advisability of the action in a user interface executing on a user device operated by the entity.

Where the advisability of the action is unadvisable, the method may further include taking one or more additional actions to prevent the unadvisable action from proceeding.

Collecting the information about the goals of the entity may include collecting the information via a user interface executing on a user device operated by the entity.

The present disclosure provides a computer-implemented system for intelligent recommendations. The system is configured to generate and provide personalized recommendations for users of personal financial management software systems such as online, desktop or mobile banking applications.

In an aspect, there is provided herein a computer-implemented neural network-based personalized financial recommendation assistant system. The system combines two artificial intelligence models in separate domains and similarities between the morphologies of learned inferences are enforced across the domains. In an embodiment, the system includes a generative code effectiveness learning model ("code effectiveness model") and a goal-oriented financial transaction optimization network ("transaction optimizing network"). The generative code effectiveness learning model includes a convolutional neural network architecture. The generative code effectiveness learning model may be configured to optimally map elements of a feature space to effectiveness in user interface workflow scenarios. The goal-oriented financial transaction optimization network includes a feed-forward architecture. The goal-oriented financial transaction optimization network is configured to model future changes in the state of a user's initial financial assets. The two separate neural networks of the system communicate and mutually update each other through a functional mapping. The system may generate and provide personalized recommendations for users of personal financial management software systems such as online, desktop or mobile banking applications.

Generative models learn how the data is generated and therefore use that to classify unseen data, whereas discriminative models learn only the differences (boundaries) between each class. In one embodiment, the classifications are generated by a generative AI engine (e.g. first AI model), and then those classifications are communicated to a discriminative model AI engine (e.g. second AI model) where the mapping to a set of user behaviors can be evaluated.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
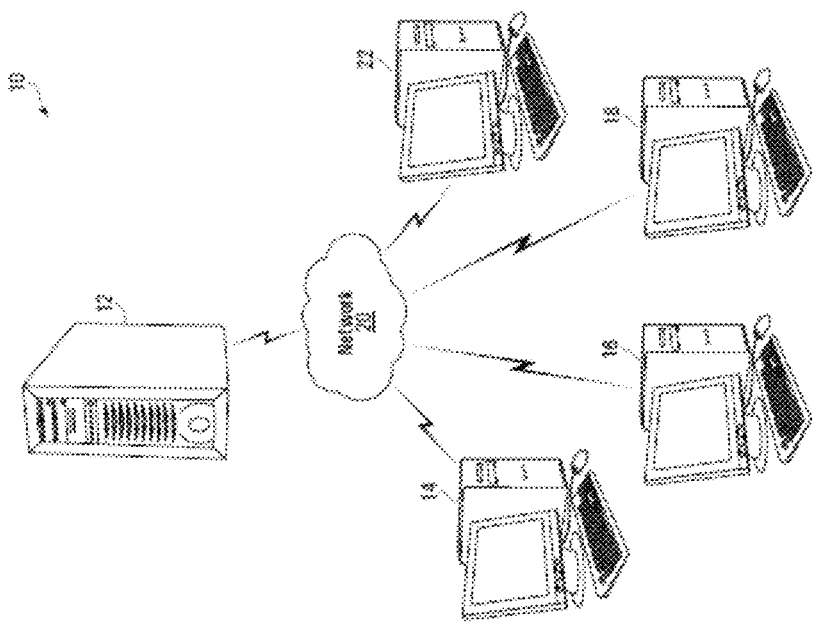
FIG. 1 is a schematic diagram of a neural network-based personalized financial recommendation assistant system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to intelligent recommendation systems, and more particularly to personalized recommendations for users of personal financial management software systems such as online, desktop or mobile banking applications.

While embodiments of the systems, methods, and devices of the present disclosure may be described in the context of financial recommendations and financial resource management software systems, it is to be understood that financial recommendations represent one potential application of the systems, methods, and devices described herein and that the systems, methods, and devices of the present disclosure may be applied to domains other than the financial domain and that such applications in non-financial domains are expressly contemplated herein.

Machine learning algorithms struggle to process large amounts of data. This is particularly true in constrained environments such as on mobile devices. Currently out of reach for most machine learning are reactive, continually-training algorithms that adapt to user behaviour. The present disclosure provides a system wherein two AI models working in two separate domains are combined, and similarities between the morphologies of learned inferences are enforced across the domains, thereby making complex tasks more tractable.

This approach, however, may be particularly suited to applications of a specific type, namely, where the functions learned in the first and second domains are correlated by some, even weak relationship.

In the present case, the fixed or continuous preferences of the user provide this relationship or link. The relationship used by the systems and methods described herein is the relationship between a user's inclination to participate with a particular financial strategy by going through the steps of executing the financial strategy and the user's inclination to complete a UI workflow by completing the workflow.

The quality of experiences using interface elements are approximately mapped to similar experiences that are had when a user executes the steps of a financial plan. The system is thus configured to learn how to optimally combine these experiences (using interface elements and executing steps of a financial plan) for each particular user, so that users are inclined to complete the financial plans that are presented to them by a pair of AI models that work together to create user interfaces and financial plans that achieve the user's goals.

The user's goals may include budget management. For example, a user may specify a budget managing profile to be created or used by the system of the present disclosure for adoption by the user. Such a budget managing profile may advantageously make recommendations to the user regarding budgeting and financial behaviour (e.g., how much of the user's income to set aside for retirement savings goals). Such a budget managing profile may, in addition to or instead of recommendation functionality, create and/or store recommendation data so that other applications may further make recommendations to the user regarding budgeting behaviour.

The systems and methods of the present disclosure may have various applications. In one example, the system may be used to predict user purchases in near real-time. Under the learning model used by the system, a purchase can be represented by the complexity and morphology of the purchase workflow, and the circumstantial state of the user's financial assets at the time of prospective purchase.

The system may be configured to generate workflows which are likely to be preferred by particular users in particular circumstances based on past successes and failures.

However, since embodiments of the system may be capable of "understanding" stochastically generated arbitrary code via feature extraction, the stochastic code generation may be swapped with pre-supplied interface code. Pre-supplied interface code may, for example, be the JavaScript or HTML of forms found on arbitrary online stores during a user's browser session.

Hence, the system may be applied to predicting the successfulness of a purchase interface "found in the wild", and indeed to use the inputs as training data for its continual learning process. Since user-specific interface optimality is an important element of the system's learning process, it is also possible to train the system on any arbitrary user interfaces that constitute workflows. These need not be constrained to the financial domain, and the learned data may still be useful for future financial workflow generation.

Other systems for purchase prediction exist. However, these systems involve a number of linear steps. These steps typically include creating structured data, labeling the data, training a network, and then storing the trained network for future reference. The downside to these approaches is that once the network is trained, it does not learn evolving user preferences any longer. The system of the present disclosure also improves upon these approaches by including an optimally represented model of the user's financial context. This context, as well as the user's past interface usage tendencies, and the mapping algorithm between the two, are important elements that make it feasible to maintain a continually-running assistant system that does not have to stop training and be stored in a database.

The system of the present disclosure is also not specific to purchase prediction. As purchases are modelled by the complexity and morphology of the purchase workflow, and the circumstantial state of the user's financial assets at the time of prospective purchase, so can any digitized finance-related decision-making process be represented. For example, the system might predict whether a user is likely to use a particular bank's online banking interface to perform a task like sending an e-transfer based on the interface and their financial assets.

In another use case that is unique to the system of the present disclosure, due to its design as two separate neural networks which communicate and mutually update each other through a functional mapping, either neural network can be swapped out and the system will continue to perform. So, for example, the feed-forward neural network that represents the user's assets, goals, and possible decision-making paths for the user to get from the former to the latter, might be swapped out for another network altogether which might not represent the user's financial reality, but perhaps a hypothetical scenario. In this way, predictions on the user's behaviour in future or imaginary scenarios may be made. This may have applications in gaming, virtual reality, psychological profiling, speculative investment, and other similar domains.

The present disclosure provides a computer system for machine learning that is specific to scenarios that span two domains. The domains include a quantitative domain where a strategy may be formulated to achieve defined quantifiable goals using limited resources, and a qualitative domain in which there are only qualitative evaluations of effective strategies. An example of such a quantitative domain is financial management. An example of such a qualitative domain is a scenario of user-interface interaction. User interface effectiveness may only be evaluated by human feedback.

The present disclosure further provides a system which includes both a first mechanism usable by a machine to choose how to present an element of a user interface graphically and a second mechanism usable by a machine to select the best strategy for a particular user to achieve a financial goal.

The effectiveness of interaction tactics for a particular user is first learned by a neural network. The financial assets and goals of the user are provided directly to a transaction optimizing neural network.

The space of possible transactions that may be used to achieve the user's goals is traditionally untenable to comprehensively model in normal circumstances which involve innumerable possible financial interactions such as paychecks, lunches, rentals, mortgage payments, and the like.

However, a new technique of constraining the possible paths to those paths that are most likely to succeed can be achieved by the system of the present disclosure. This can be achieved by using the morphologies of user interface workflows that are known to be effective to constrain the morphologies of the possible highly-weighted subgraphs that may develop in the transaction optimizing neural network, thereby limiting the possible inferences to those that a user is likely to choose to enact. This in effect is a mechanism that allows a first neural network to use its learned experience with a particular user to automatically constrain a second network whose structure is based on these inferences. This constraint can be verified by the success of a financial workflow, and further feedback of this kind can be used to train the first network. This creates a type of multiple-feedback and hyper-parameterization that is not historically employed in machine learning systems where the constraints of one network whose data inputs belong to one data domain are learned by another that processes data in another separate domain, and vice versa.

Further, it is sufficient for the recommendation system of the present disclosure to be able to calculate the likelihood of each particular financial choice, whether suggested or incidental, to cause a divergence from the set of optimal paths simply by simulating the one choice that currently faces a user and measuring whether the two Boolean responses to that choice would "solidify" (increase the weights of) a subgraph that would solve the user's financial goals or "diffuse" the existing subgraphs. Hence, the recommendation system does not need to be computationally intensive, as the recommendation system only needs to be able to simulate the user's current financial status with sufficient detail to understand the effect of incoming changes which it need not understand beyond their amount, and whether or not they directly contribute to a goal based on how the movement of funds, as represented by a change to the neural network's input space, affects the solidity of subgraphs in the network.

Another optimization provided a "re-entrant" embodiment of this new class of neural network is that the process may be simplified each time a user progresses towards their goal. Immediately after a goal or set of goals is defined, the transaction optimizing neural network will attempt to model the space of all of those transactions which are likely to be enacted by a user if directly encouraged by a user interface workflow, when the sufficient circumstantial conditions are met (such as access to funds). When a user makes a choice, or receives funds that move them closer to the goal, the model may incorporate this change by applying a Bayesian update to the first hidden layer of the network which in effect reduces it from a densely connected layer to a sparsely connected layer, or a layer with only one non-zero weighted edge. After such a Bayesian update occurs, the transaction optimizing neural network may simply shed its first layer in order to quickly obtain a new model which accurately represents the new situation without requiring any further computation. However, it may be useful to incur some extra computation at this stage by allowing the transaction optimizing network to inform the code effectiveness learning network of the change, so that the code effectiveness network may in turn be constrained and re-perform its selection of paths that are likely to succeed based on the morphology of the newly reduced transaction optimizing neural network. Once the code effectiveness network is finished doing this, the code effectiveness network may once again constrain the transaction optimizing model by pruning neurons that represent paths unlikely to be successfully encouraged. This mutual reduction occurs until the user's goals are reached. Hence, the neural network is re-interpreted as a recursive algorithm whose base-case is the satisfaction of the user-defined cost function which represents the achievement of their financial goals. The recursive nature of the construction guarantees that if a person does in fact work towards their goal, the algorithmic modelling of the problem space is tractable and converges. The recursion of the code effectiveness model's selection of effective interaction strategies also allows the recommendation system (assistant) to demonstrate behaviour that is reactive to the user's ongoing interactions to it.

Generative models learn how the data is generated and therefore using that to classify unseen data, whereas discriminative models learn only the differences (boundaries) between each class. In one embodiment, the classifications are generated by a generative AI engine (e.g. first AI model, code effectiveness learning model), and then those classifications are communicated to a discriminative model AI engine (e.g. second AI model, transaction optimizing model) where the mapping to a set of user behaviors can be evaluated.

Referring now to FIG. 1, shown therein is a block diagram illustrating a neural network-based personalized recommendation assistant system 10, in accordance with an embodiment. The system 10 is an intelligent recommendation system configured to provide personalized recommendations for users of resource management software systems such as online, desktop, or mobile banking applications. The recommendations may be financial recommendations or may be recommendations directed towards behaviors that have indirect financial implications.

The system 10 includes a server platform 12 which communicates with a plurality of user devices 14, 16, 18 via a network 20. The server platform 12 may communicate with a second server platform 22 via the network 20.

The server platform 12 may be a purpose-built machine designed specifically for providing an intelligent recommendation system using machine learning techniques such as neural networks.

The server platform 12, user devices 14, 16, 18, and second server 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The network 20 may be a wide area network (WAN). The network 20 may be a private network, such as a virtual private network (VPN). The network 20 may be a software-defined WAN. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. The processor may execute applications, computer readable instructions or programs. The applications, computer-readable instructions, or programs may be stored in memory or in secondary storage, or may be received from the Internet or other network 20. The input device may include any device for entering information into device 12, 14, 16, 18, 22. For example, the input device may be a keyboard, key pad, cursor-control device, touch-screen, camera, or microphone. The display device may include any type of device for presenting visual information. For example, the display device may be a computer monitor, a flat-screen display, a projector, or a display panel. The output device may include any type of device for presenting a hard copy of information, such as a printer for example. The output device may also include other types of output devices such as speakers, for example. In some cases, device 12, 14, 16, 18, 22 may include multiple of any one or more of processors, applications, software modules, secondary storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

In the description that follows, devices such as server platform 12, user devices 14, 16, 18, and second server 22 are described performing certain acts. It will be appreciated that any one or more of these devices may perform an act automatically or in response to an interaction by a user of that device. That is, the user of the device may manipulate one or more input devices (e.g., a touchscreen, a mouse, a button), causing the device to perform the described act. In many cases, this aspect may not be described below, but it will be understood.

As an example, it is described below that the devices 14, 16, 18, 22 may send information to the server platform 12. For example, a user using the user device 14 may manipulate one or more input devices (e.g., a mouse and a keyboard) to interact with a user interface displayed on a display of the user device 14. Generally, the device may receive a user interface from the network 20 (e.g., in the form of a webpage). Alternatively or in addition, a user interface may be stored locally at a device (e.g., a cache of a webpage or a mobile application).

Server platform 12 may be configured to receive a plurality of information from each of the user devices 14, 16, 18, and the second server 22. Generally, the information may include at least an identifier identifying the user device or second server. For example, the information may comprise one or more of a username, e-mail address, password, social media handle, or the like.

In response to receiving information, the server platform 12 may store the information in a storage database. The storage may correspond with secondary storage of the device 12, 14, 16, 18, 22. Generally, the storage database may be any suitable storage device such as a hard disk drive, a solid state drive, a memory card, or a disk (e.g., CD, DVD, Blu-ray). Furthermore, the storage database may be locally connected with server platform 12. In some cases, storage database may be located remotely from server platform 12 and accessible to server platform 12 across a network, for example. In some cases, storage database may comprise one or more storage devices located at a networked cloud storage provider.

Figure 2:
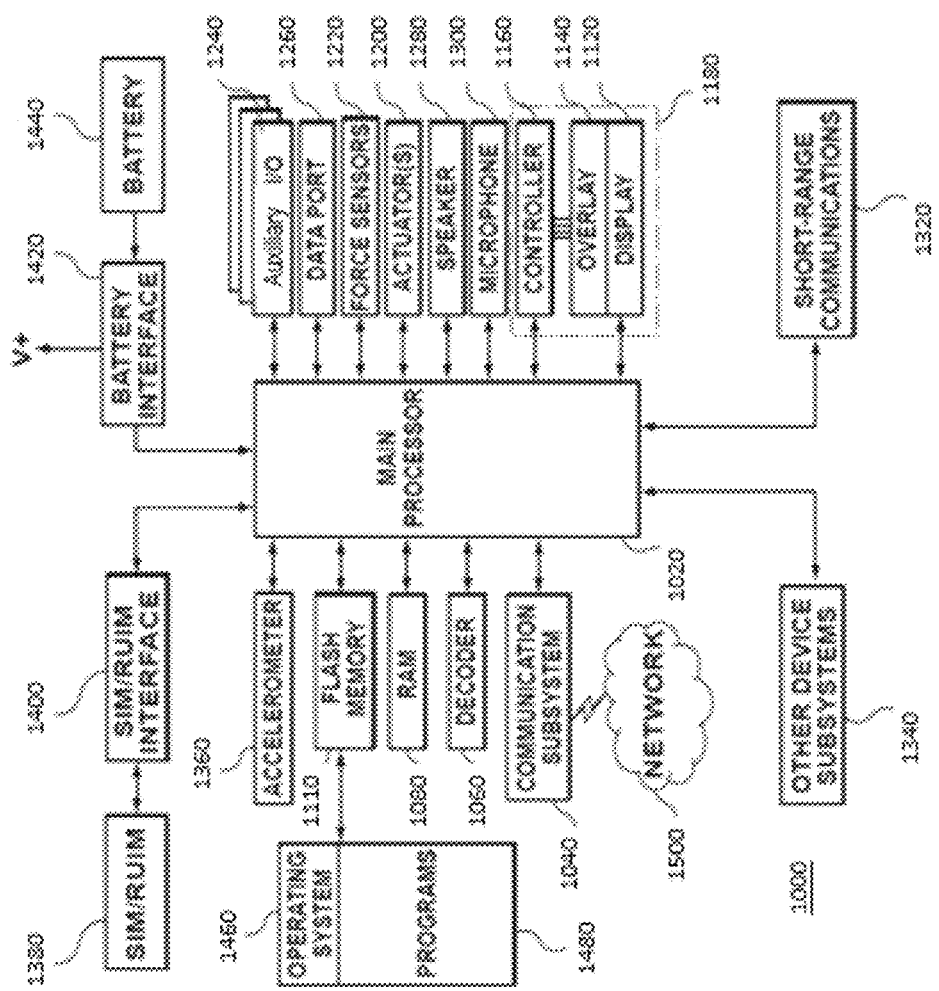
FIG. 2 is a block diagram of a computing device of FIG. 1.

Referring now to FIG. 2, shown therein is a simplified block diagram of components of a computing device 1000. The computing device 1000 may be a mobile device or portable electronic device. The computing device 100 may be any of devices 12, 14, 16, 18, 22 of FIG. 1. The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g., with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 1020 may be displayed on the touch-sensitive display 1180.

The processor 1020 may also interact with an accelerometer 1360. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

Figure 3:
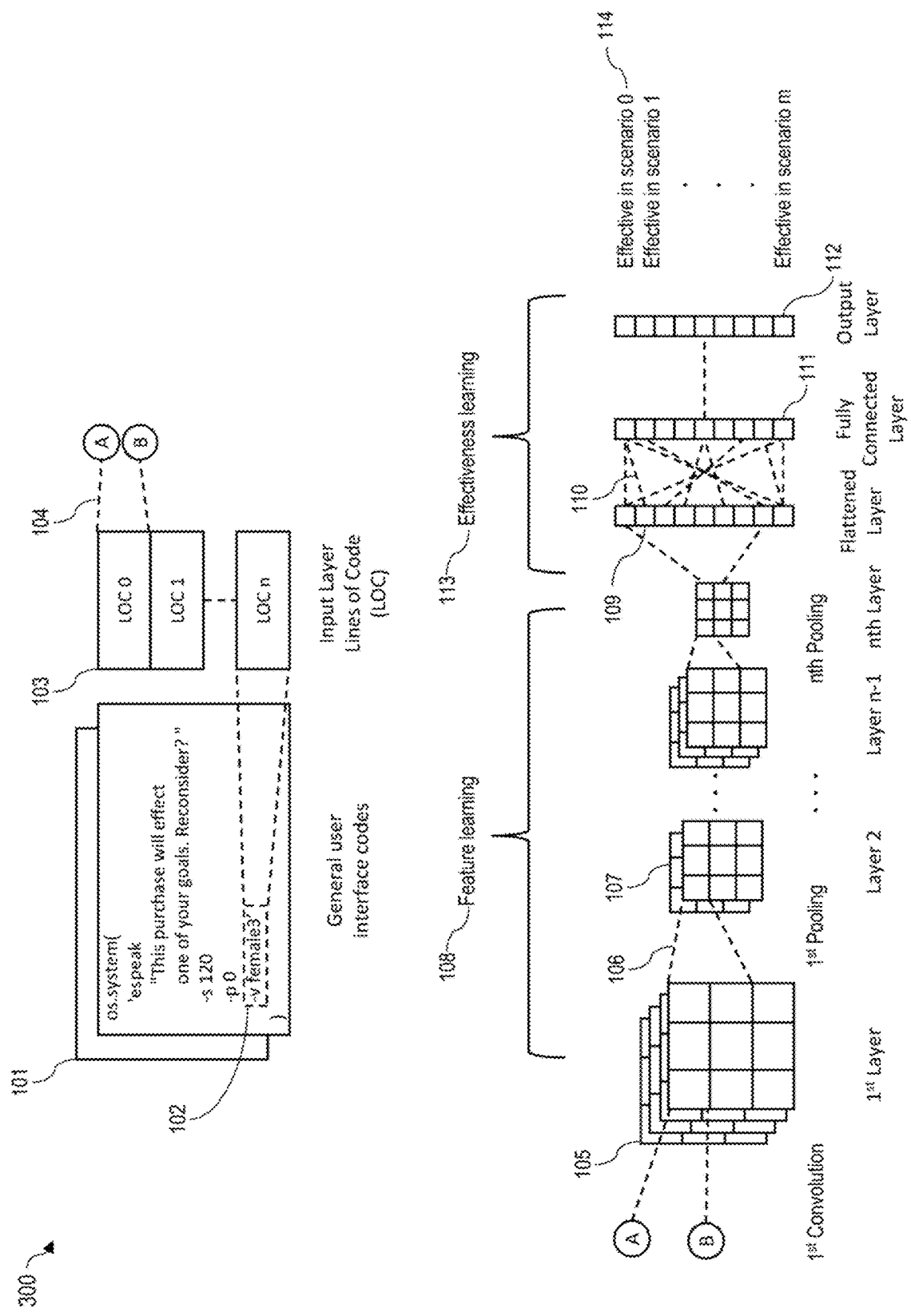
FIG. 3 is a model of a generative code effectiveness learning model with a Convolutional Neural Network (CNN) architecture for use in a personalized financial recommendation assistant system, according to an embodiment.

Referring now to FIG. 3, shown therein is a model 300 of a generative code effectiveness learning model ("code effectiveness model 300" or "code effectiveness network 300") for use in a personalized financial recommendation assistant system, according to an embodiment. The model 300 may be used in other personalized recommendation assistant systems outside of the financial domain. The code effectiveness model 300 includes a Convolutional Neural Network ("CNN") architecture. The CNN model 300 corresponds to an embodiment involving a generative audio-based user interface 101 based on espeak Speech Synthesizer.

The code effectiveness model 300 includes statistically generated instances of audio interface code 101. Elements 102 of the code 101 are extracted to form an input layer 103 as well as alternating convolution 104 and pooling 106 operations and their corresponding layers 105, 107.

These alternating layers form a feature learning subnetwork 108 of the CNN 300.

The feature learning subnetwork 108 is followed by the effectiveness learning subnetwork 113.

The effectiveness learning subnetwork 113 is a feed-forward neural network that is configured to optimally map the elements of the feature space 105 to effectiveness in UI 101 workflow scenarios.

The effectiveness learning subnetwork 113 includes a flattened layer 109 and a fully-connected layer 111.

The flattened layer 109 contains all of the information of the last pooling layer of the feature learning subnetwork 108.

The fully-connected layer 111 is designed to contain enough neurons to represent the number of different scenarios 114 contained in a given UI 101 workflow for which a particular element of the feature space 105 may be selected for use.

The weights and biases associated with the edges 110 in the effectiveness learning subnetwork 113 form a mapping between features 105 and their effectiveness in UI workflow scenarios 114.

The network 300 includes an output layer 112. The output layer 112 of the network 300 indicates as a set of Booleans whether there are any combinations of UI features 105, 107 that are effective for each scenario 114.

These Booleans may be determined by the application of a SoftMax or similar function to the previous fully-connected layer 111.

The feed-forward network may be trained in real time to achieve the creation of the feature-effectiveness mapping 110.

Figure 4:
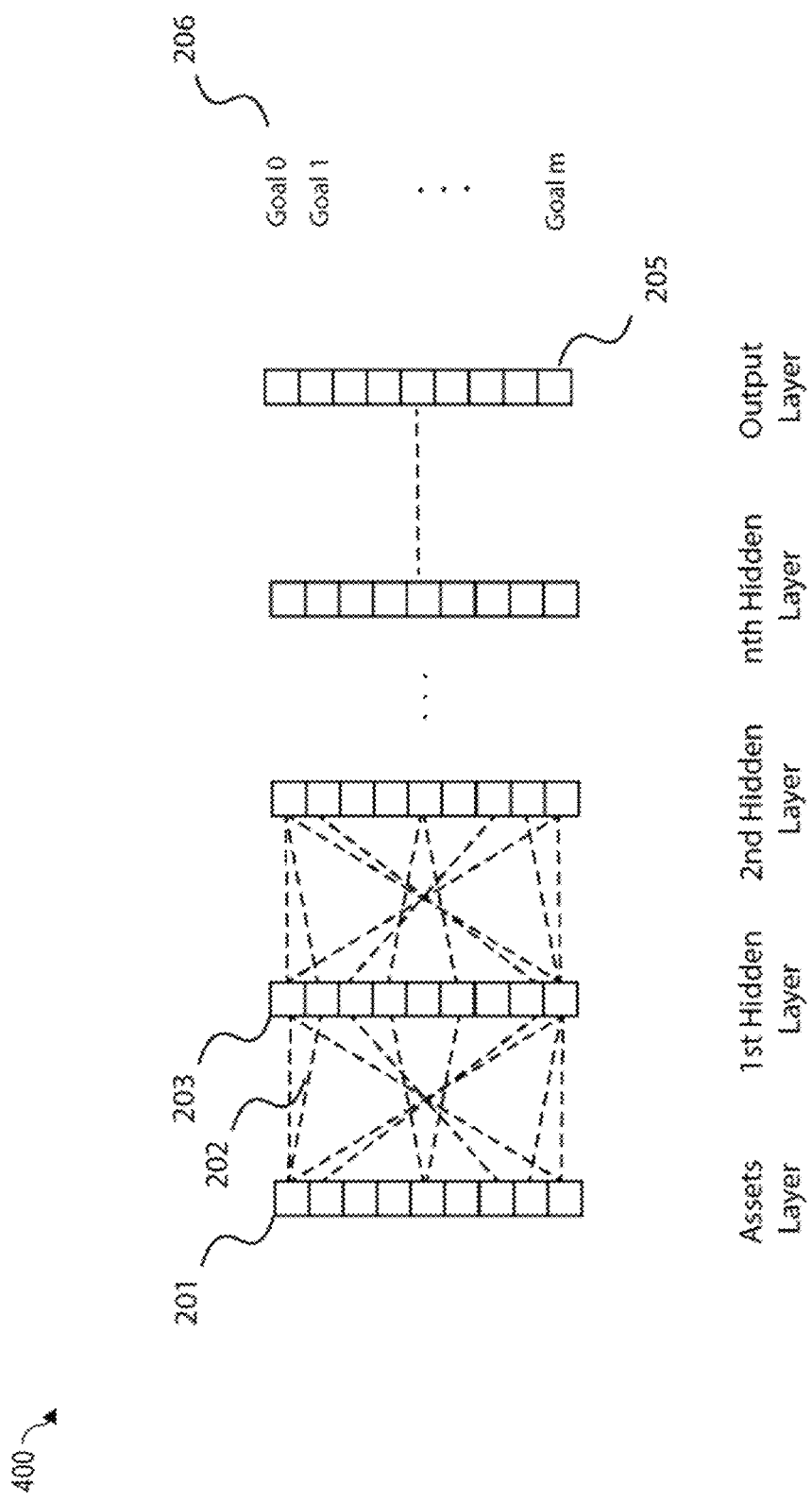
FIG. 4 is a model of a goal-oriented financial transaction optimization network with a feed-forward architecture for use in a personalized financial recommendation assistant system, according to an embodiment.

Referring now to FIG. 4, shown therein is a model 400 of a goal-oriented financial transaction optimization neural network ("transaction optimizing network 400") for use in a personalized financial recommendation assistant system, according to an embodiment. In other embodiments, the model 400 may be a goal-oriented optimization neural network. The transaction optimizing network 400 includes a feed-forward architecture.

The transaction optimizing network 400 is configured to model future changes in the state 202 of a user's initial financial assets 201. The user's initial financial assets 201 may be considered user resources or user resource data. The user's financial assets may include user financial data. User financial data may include asset values, account balances, investments, anticipated financial inputs and outputs, etc.

The transaction optimizing network 400 includes an assets layer 201. The assets layer 201 may be an input layer of the network 400. In other embodiments, the assets layer 201 may be a user resources layer.

The transaction optimizing network 200 includes hidden layers 203. Each hidden layer 203 in the transaction optimizing network 200 corresponds to an intermediate state between a user's initial assets 201 and user goals 205. In this context, the user goals 205 may be financial goals. In other embodiments, the user goals 205 may be other kinds of user goals. The user goals 205 may be an output layer of the network 400.

The depth of the transaction optimizing network 200 corresponds to the complexity of the process required to reach a set of goals 205.

The layers need not be fully connected, as these connections reflect the possible transactions a user can make 202.

The achievement of a goal 206 can be defined by a cost function. The cost function may be generated from user-provided parameters.

Further operation of components of the neural network-based personalized financial recommendation assistant system of the present disclosure will now be described in further detail with reference to FIGS. 3 and 4, including further details on the operation of the code effectiveness model 300 and transaction optimizing network 400.

A user's interactions with presentation-layer attributes 103 of elements 102 of a user interface (UI) 101 are learned by the code effectiveness model 300. The code effectiveness model 300 comprises a continually-training machine learning system.

The elements of the UI 101 may be presented in formats including but not limited to graphical, text-based, and audio formats.

Interface elements 102 in each of these embodiments have a number of attributes 103.

Example attributes 103 of a general Graphical User Interface (GUI) 101 element 102 include color, orientation, and styling.

More specifically, web-based user interface 101 elements 102 have attributes 103 including Cascading Style Sheet (CSS) styles such as background-color, text-align, etc.

Text-based interface 101 elements 102 have attributes 103 including font, tone, structure, and meaning.

Audio interface 101 elements 102 have attributes 103 such as tone, gender and speed, etc.

A user's financial goals 206 may be collected through one or more user interfaces 101 or through one or more integrations with third party financial management software. User financial goals 206 may include, for example, saving or spending goals. Saving or spending goals may be generic or specific. Specific goals may include saving or spending for a specific user-defined purchase.

A user's assets 201 are updated using data collected through user interface(s) 101 or through integration(s) on an ongoing basis.

The user assets 201 are represented by an input state denoted Ain. The n goals 206 are each represented by a subspace $G_n$ of an output space $G_{out}$. These input and output spaces are taken to describe the ideal inputs and outputs (I/O) of a feed-forward neural network 400 (transaction optimizing network 400) designed to represent the linear set of transactions 202 that would be required for the goals $G_{out}$ to be reached. In this feed-forward network 400, each edge 202 is representative of a change of state of the user's assets 201 and, equivalently, changes in progress towards the user goals 206.

In one embodiment, the feed-forward transaction optimizing neural network 400 may be trained using stochastically generated data to approximate the set of transactions 202 that a user would need to enact to reach their goals 206. Goal achievement conditions may be selected and incorporated into the feed-forward neural network's 400 loss function, such as, but not limited to ordered goal priorities, unordered goal significance, etc.

In one embodiment, the historical effectiveness 114 of particular attributes 103 and elements 102 for a user are represented by persisted weights and biases 110 within a CNN model 300 (code effectiveness model 300) designed with a structure to mimic the interface 101 elements' 102 attributes 103. The kernel's 104 function in this embodiment is to extract compositions of attributes 105 from examples of stochastically generated UI codes 101. This creates a feature space 105 representing unique compositions of attributes 103.

In one embodiment, the code effectiveness CNN model 300 is trained on an ongoing basis during user interactions to optimize for the effectiveness of UI elements 103. Effectiveness 114 is represented by the loss function of the CNN model 300. The loss function of the CNN model 300 measures how effective particular attribute compositions 105 are in bringing a user through specific scenarios (i.e., user interface workflows).

In some embodiments, additional convolutional layers 108 may be added to the code effectiveness CNN model 300. This may enable the association of lower or higher-order compositions 107 of attributes with effectiveness 114.

A user's financial choices are evidenced by transactions 202. The transactions 202 may relate, for example, to investments, spending, or saving.

The transactions 202, as seen by a user's banking and/or financial management software systems, are continually compared to the optimal paths found by the transaction optimizing feed-forward neural network 400.

In some embodiments, suggestions or messages are generated and presented in an interface pre-emptively to advise a user during their daily activities. The elements 101 and attributes 103 used to compose these messages may be chosen simply according to their observed general effectiveness 114 in bringing a user through workflows.

A pre-emptive message may be generated in response to an impending transaction that either positively or negatively affects user assets 201 that the feed-forward neural network 400 identifies are "useful" for goals 205 to be reached.

The usefulness of assets 201 is directly represented by the weights on the edges 202 in the feed-forward neural network 400 that create any graph of highly-weighted edges 202 connecting the useful assets 201 to sufficiently significant goals 206. The sensitivity to the weight of the edges 202 and goal significance required to trigger a pre-emptive message may be a configuration option to the user.

In some embodiments, an option is presented to the user to launch a UI 101 workflow that will expedite the acquisition of their goals 206 by presenting each of the optimal set of steps 202 in one continuous workflow. In other embodiments, each step 202 may be associated with a datetime entered by the user, such as expected paydays or other financial events.

The workflow may then be spilt about these events. This may create a coherent set of shorter workflows. The coherent set of shorter workflows may together serve the purpose of reaching the user's goals 206.

The generative UI workflow synthesis procedure includes searching for embedded graph structures within the code effectiveness CNN model 300 that match the morphology of the transaction network solved by the transaction optimizing feed-forward neural network 400.

If a graph is found to be embedded in the CNN model 300 as a highly weighted structure of feature subspaces, then the attribute compositions 105 that compose those subspaces are chosen to generate the UI 101 elements 102 presented at each corresponding step of the workflow.

Figure 5:
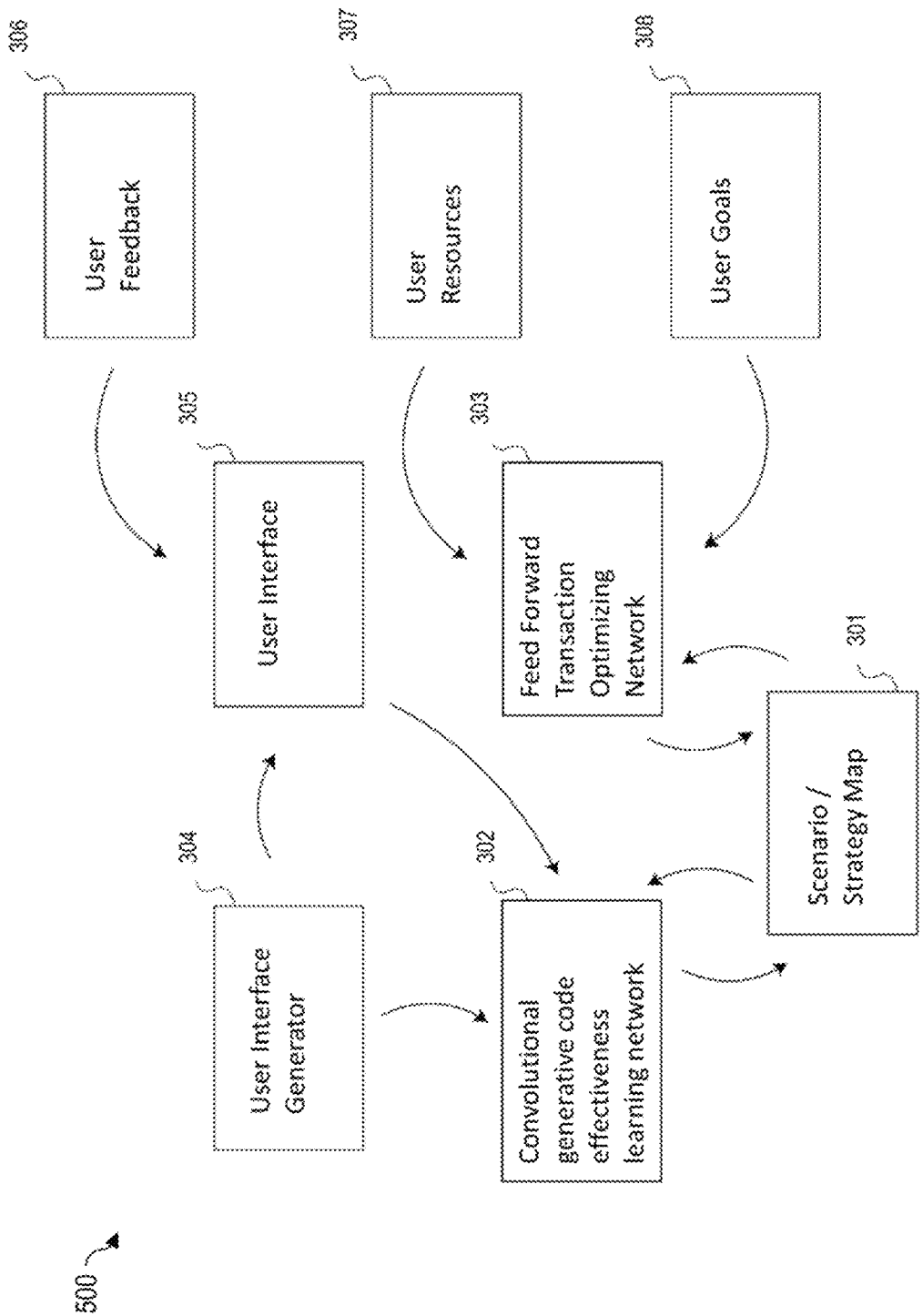
FIG. 5 is a block diagram of a system architecture model for a personalized financial recommendation assistant system including a goal-oriented financial transaction optimization network and a goal effectiveness learning model, according to an embodiment.

Referring now to FIG. 5, shown therein is a system architecture model 500 for the neural network-based personalized financial recommendation assistant system of the present disclosure, according to an embodiment. The system architecture model 500 is shown as a system-level diagram of a computer network architecture.

The system architecture model 500 illustrates how the goal-oriented financial transaction optimization network 400 and goal effectiveness learning model 300 work together to form a neural network-based personalized financial recommendation assistant system of the present disclosure.

The computer network architecture 500 includes computing components 301, 302, 303, 304. The computing components include a scenario/strategy map 301, a convolutional generative code effectiveness learning network 302, a feed-forward transaction optimizing network 303, and a user interface generator 304.

The scenario/strategy map 301 may be a functional mapping (e.g. mapping algorithm) between the convolutional generative code effectiveness learning network 302 and the feed-forward transaction optimizing network 303. For example, in one embodiment, classifications are generated by a generative AI engine (e.g. network 302), and then those classifications are communicated to a discriminative model AI engine (e.g. network 303) where the mapping to a set of user behaviors can be evaluated.

The scenario/strategy map 301 (or mapping module, or model mapping module) may facilitate communication between the convolutional generative code effectiveness learning network 302 and the feed-forward transaction optimizing network 303. The scenario/strategy map 301 may facilitate mutual updating between the convolutional generative code effectiveness learning network 302 and the feed-forward transaction optimizing network 303.

The convolutional generative code effectiveness learning network 302 may be the code effectiveness model 300 of FIG. 3. The feed-forward transaction optimizing network 303 may be the transaction optimizing network 400 of FIG. 4. In some embodiments, the computing components 301, 302, 303, 304 may each be a separate computer, server or microservice.

The computer network architecture 500 includes a user interface 305. The user interface 305 may, in some embodiments, be a browser or mobile device application.

The computer network architecture 500 includes data streams 306, 307, 308. The data streams 306, 307, 308 represent the sources for information about a user's feedback to the system 500 (user feedback data), resources (user resource data), and goals (user goal data), respectively. The sources for resources and goal information may, in some embodiments, be banking APIs or may be forms provided directly to the user.

The user goal data may relate to budget management. For example, a user may specify a budget managing profile which may supply the user goal data or a subset thereof. The budget managing profile may be created using the system of the present disclosure, such as through user interaction through a user interface. The budget managing profile may be supplied to the system from an external source, such as another software application (e.g. banking or financial management software applications). Such a budget managing profile may advantageously make recommendations to the user regarding budgeting and financial behaviour. For example, recommendations may indicate how much of the user's income to set aside for retirement savings goals or whether the purchase of a particular item is consistent with goals. Such a budget managing profile may, in addition to or instead of recommendation functionality, create and/or store recommendation data so that other applications may further make recommendations to the user regarding budgeting behaviour.

The operation of the system 500 will now be described.

A user's goals 308 and resources 307 are supplied by some method to the running feed-forward transaction optimizing network 303.

The topology, depth, and width of the transaction optimizing neural network 303 is constrained by the user's goals 308.

The depth of the transaction optimizing network 303 corresponds to the number of steps the user is willing to take to achieve their quantitative goals 206.

The transaction optimizing network 303 is trained using a cost function that is representative of the nuance of the user's goals 308. For example, a user may prioritize the goals 308, which would result in a cost function that values some results over others. The prioritization of the goals 308 may be provided as input data to the system by the user.

The topology of the trained transaction optimizing network 303 is representative of the ways that the user's resources 307 may be optimally distributed to achieve the maximal satisfaction of the cost function.

The inputs for training are the user's resources 307.

Each edge in the trained network 303 represents a predicted change of state to the user's resources 307. When a change of state occurs in actuality, then the data source 307 reflects this change. The transaction optimizing neural network 303 is updated to reflect this change by a Bayesian update. One reason such a change may occur is that the user interacted (e.g., by providing user feedback data 306) with a user interface 305 that presented the user with a step in a financial management workflow. This user interaction is used as feedback 306 to the convolutional generative code effectiveness learning network 302.

The code effectiveness CNN model 302 is trained as generated user interfaces 305 are interacted with via user feedback 306, and as the feed-forward transaction optimizing network 303 is trained.

The user interface generator 304 stochastically generates random user interfaces 305.

As user feedback 306 comes in, the code effectiveness CNN model 302 learns in the effectiveness learning subnetwork 113 the categorical effectiveness 114 of UI features 105.

In subsequent workflow generation procedures (e.g., by user interface generator 304), the output of the UI generator 304 is made of UI features 105 that satisfy the code effectiveness CNN model's 302 conditions for effectiveness in the given scenario 114. The scenario at any given point is selected by the scenario/strategy map 301. The scenario/strategy map 301 extracts the weights from the feed-forward transaction optimizing network 303 and maps the set of edges 202 and nodes 203 to workflow steps and decisions, organizing them in an order reflected by the depth of the nodes in the feed-forward transaction optimizing network 303.

Figure 6:
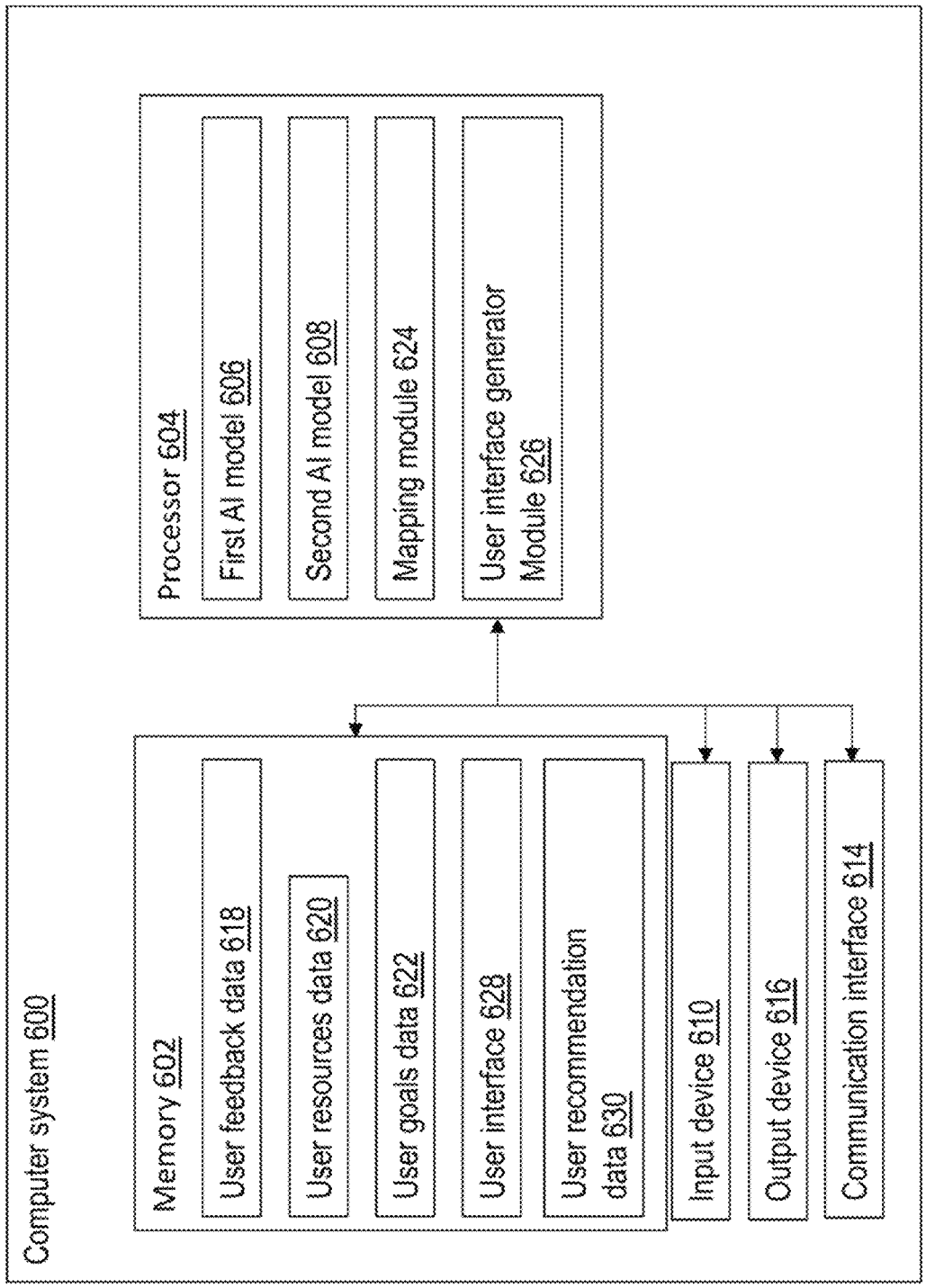
FIG. 6 is a block diagram of a computer system for making personalized recommendations, according to an embodiment.

Referring now to FIG. 6, shown therein is a computer system 600 for making personalized recommendations to a user, according to an embodiment.

The system 600 may be the system 500 of FIG. 5. The system 600, or components thereof, may be implemented by one or more devices of the system 10 of FIG. 1, such as the server platform 12 or the user devices 14, 16, 18.

The computer system 600 includes a memory 602 and a processor 604 in communication with the memory 602. The memory 602 stores data used and generated by the system 600. The processor 604 is configured to execute various software modules and artificial intelligence or machine learning models, such as first model 606 and second model 608. The computer system 600 also includes an input device 610 for receiving input data from a user, a communication interface 614 for sending and receiving data to and from the computer system (or between computer devices which are part of the computer system 600), and an output device 616 for outputting information to a user (e.g., display, speakers).

The memory 602 stores user feedback data 618, user resources data 620, and user goals data 622. The user feedback data 618, user resources data 620, and user goals data 622 may be user feedback 306, user resources 307, and user goals 308 of FIG. 5, respectively.

The processor 604 includes a first AI model 606 and a second AI model 608. The processor 604 also includes a mapping module 624 and a user interface generator module 626. The user interface generator module 626 is configured to generate a user interface 628. The user interface 628 is stored in the memory 602.

The processor 604 may generate user recommendation data 630. The user recommendation data 630 may be stored in the memory 602. The user interface 628 may output the user recommendation data 630 to the user and receive user feedback data 618. The user recommendation data 630 may include the most likely recommendation that the user may follow. The user recommendation data 630 may include the best recommendation for the user to follow. The user recommendation data 630 may be generated or refined according to a weighted metric that takes into account the most likely recommendation that the user may follow and/or the best recommendation for the user to follow. Assessment of the best recommendation for the user to follow may be determined according to user feedback data 618, user resources data 620, and/or user goals data 622. The user recommendation data 630 may be generated or refined according to user input received through the input device 610. Such user input may be received before, during, and/or after the user recommendation data 630 is provided. The user recommendation data 630 may be generated or refined periodically, upon user request, and/or upon completion of operations of the processor 604 and/or the system 600.

The first AI model 606 operates in a first domain. The second AI model 608 operates in a second domain. The first and second domains are separate. The system enforces similarities between morphologies of learned inferences across the first and second domains. In doing so, the system 600 may make complex tasks more tractable.

The first AI model 606 may determine how to present an element of the user interface 628 to the user. The second AI model 608 may select the best strategy for the user to achieve a goal. The user interface 628 may present suggestions to the user and receiving user responses. The user responses may be the user feedback data 618. In an embodiment, the first AI model 606 may be configured to determine how to present an element of the user interface 628 to the user graphically. In an embodiment, the second AI model 608 may be configured to determine a preferred or optimum strategy for achieving a user-defined goal according to user goals data 622. In an embodiment, the first and second AI models 606, 608 may work together to create user interfaces (such as the user interface 628) and financial plans that achieve the user's goals according to user goals data 622, which may include financial goals.

The system 600 may include an optimally represented model of the user's financial context (not shown). This context, as well as the user's past interface 628 usage tendencies, and a mapping algorithm between the two (e.g. implemented by mapping module 624), may maintain a continually-running assistant system including models 606, 608 that does not have to stop training and be stored in a database.

In an embodiment, functions learned in the first and second domains (e.g., by first and second AI models) are correlated by a relationship. The relationship may even be a weak relationship. In an embodiment, the relationship is provided by fixed or continuous preferences of the user. The relationship may be the relationship between a user's inclination to participate in a particular financial strategy by going through the steps of executing the financial strategy and the user's inclination to complete a user interface workflow by completing the workflow.

The first domain may be a qualitative domain in which there are only qualitative evaluations of effective strategies. In an embodiment, the qualitative domain is a scenario of user interface interaction. User interface effectiveness may only be evaluated by human feedback (e.g., provided to the system 600 as user feedback data 618).

The second domain may be a quantitative domain where a strategy may be formulated to achieve defined quantifiable goals using limited resources. In an embodiment, the quantitative domain is financial management.

The system/process includes the mapping module 624. The first and second AI models 606, 608 communicate and mutually update each other via the mapping module 624. The first and second AI models 606, 608 are separate. The mapping module 624 may implement a functional mapping (not shown) between the first and second AI models 606, 608. For example, in one embodiment, the first AI model 606 is a generative AI engine or model and the second AI model 608 is a discriminative AI engine or model. Classifications are generated by the first AI model 606 (generative AI engine). The classifications generated by the first AI model 606 are communicated to the second AI model 608 (discriminative model AI engine) where the mapping to a set of user behaviors can be evaluated.

In an embodiment, the mapping module 624 may approximately map the quality of experiences using user interface 628 elements to similar experiences had when the user executes steps of a financial plan (or other resource-based strategy). Thus the system 600, for example through any one or more of the first and second models 606, 608 and the mapping module 624, may be configured to learn how to optimally combine these experiences (e.g., using interface 628 elements and executing steps of a financial plan) for each particular user, so that users are inclined to complete the financial plans that are presented to them by the first AI model 606 and second AI model 608 that work together to create user interfaces 628 and financial plans that achieve the user's goals.

The first AI model 606 may be a neural network. In an embodiment, the first AI model 606 is a generative code effectiveness learning model, such as the code effectiveness model 300 of FIG. 3. The generative code effectiveness learning model 606 may include a convolutional neural network architecture. The generative code effectiveness learning model 606 may be configured to optimally map elements of a feature space to effectiveness in user interface workflow scenarios.

The second AI model 608 may be a neural network. In an embodiment, the second AI model 608 is a goal-oriented financial transaction optimization network ("transaction optimizing network"), such as the transaction optimizing network 400 of FIG. 4. The goal-oriented financial transaction optimization network 608 may include a feed-forward architecture. The goal-oriented financial transaction optimization network 608 may be configured to model future changes in the state of a user's initial financial assets.

The system 600 may implement a technique of constraining possible paths to those paths that are most likely to succeed. For example, the system 600 may use the morphologies of user interface workflows that are known to be effective to constrain the morphologies of the possible highly-weighted subgraphs that may develop in the second AI model 608 [transaction optimizing network. This may limit the possible inferences to those that a user is likely to choose to enact. This may provide a mechanism that allows the first AI model 606 (e.g., first neural network, code effectiveness model) to use its learned experience with a particular user to automatically constrain the second AI model 608 (e.g., second neural network, transaction optimizing network) whose structure is based on these inferences. The constraint can be verified by the success of a financial workflow. Further feedback of this kind may be used to train the first AI model 606. This may create a type of multiple-feedback and hyper-parameterization in the system 600 in which the constraints of the first AI model 606, whose data inputs belong to the first domain, are learned by the second AI model 608 that processes data in the second domain, and vice versa.

Figure 7:
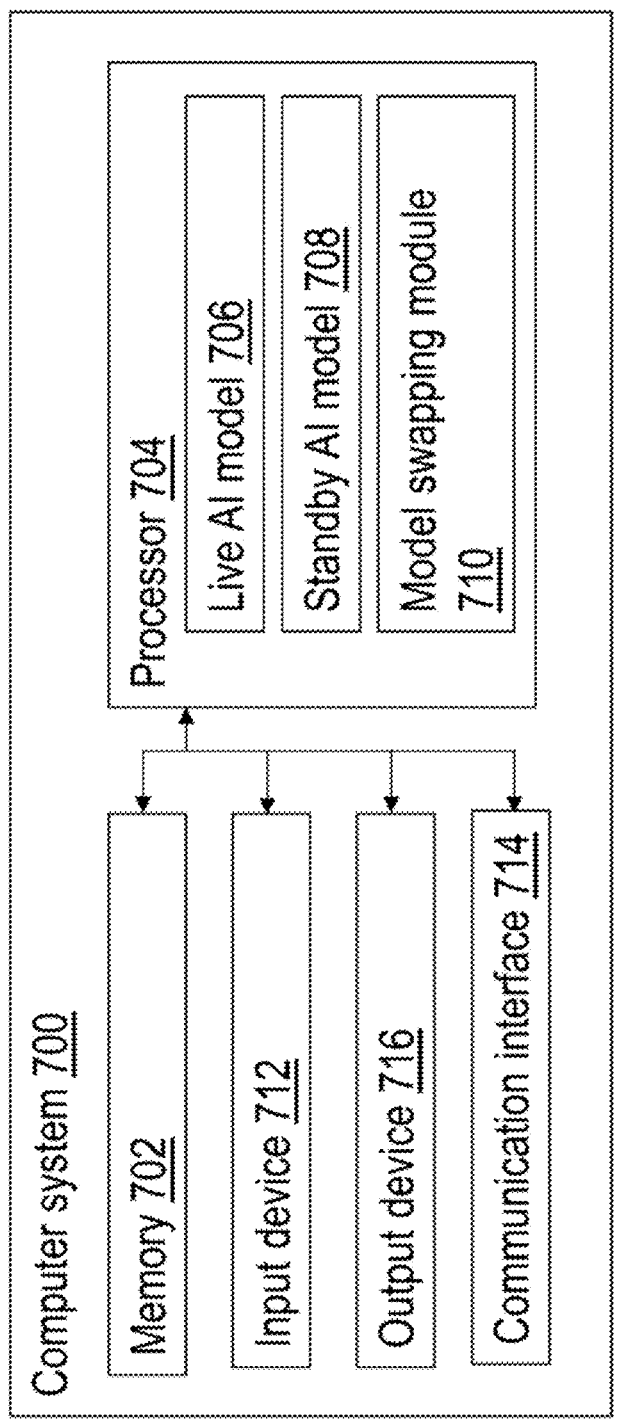
FIG. 7 is a block diagram of a computer system incorporating model swapping functionality, according to an embodiment.

Referring now to FIG. 7, shown therein is a block diagram of a computer system 700 incorporating model swapping functionality, according to an embodiment. The model swapping functionality of system 700 may be incorporated into the systems described herein. For example, the system 700, or components thereof, may be implemented as part of system 500 of FIG. 5 or system 600 of FIG. 6.

The computer system 700 includes a memory 702 and a processor 704 in communication with the memory 702. The memory 702 stores data used and generated by the system 700. The data may include user feedback 306, user resources 307, and user goals 308. The processor 704 is configured to execute various software modules and artificial intelligence or machine learning models. The computer system 700 also includes an input device 712 for receiving input data from a user, a communication interface 714 for sending and receiving data to and from the computer system 700 (or between computer devices which are part of the computer system 700), and an output device 716 for outputting information to a user (e.g. display, speakers).

The processor 704 is configured to execute a live AI model 706. In an embodiment, the live AI model 706 may be either of the first AI model 606 or the second AI model 608 of FIG. 6. The live AI model 706 may be currently active in receiving the user feedback 306 and making recommendations to the user. The live model 706 may be training on the user feedback 306 and other sources of data despite being currently active.

The computer system 700 further includes a standby AI model 708. The standby AI model 708 can be swapped in for the live AI model 706. Accordingly, the standby AI model 708 may be similar in structure and function to the live AI model 706 to which it provides standby functionality. For example, the standby AI model 708 may be a standby AI model for the first AI model 606 or the second AI model 608. The standby AI model 708 may not be currently active in making recommendations to the user. The standby AI model 708 may be training on the user feedback 306 and other sources of data.

The processor 704 is further configured to execute a model swapping module 710 for swapping between the live AI model 706 and the standby AI model 708. The model swapping module 710 advantageously swaps the functionalities of the live AI model 706 and the standby AI model 708 in the computer system 700. For example, the live AI model 706 may be placed on standby while the standby AI model 708 may become currently active in making recommendations to the user. The model swapping may occur while the computer system 700 is currently in use.

In an embodiment, the live AI model 706 may be the transaction optimizing network 400 including a feed-forward neural network that represents the user's assets, goals, and possible decision-making paths for the user to get from the former to the latter. The standby AI model 708 may be a model (e.g., neural network) that represents a hypothetical scenario, rather than the user's financial reality as represented by the live AI model 706. The model swapping module 710 is configured to swap the live AI model 706 for the standby AI model 708. In this way, the system 700 may enable predictions with respect to the user's behaviour in future or possible scenarios to be accounted for. The system 700, and in particular the model swapping functionality, may have applications in gaming, virtual reality, psychological profiling, speculative investment, and other similar domains.

It will of course be appreciated that, just as the model swapping module 710 may swap the functionality of the live AI model 706 and the standby AI model 708, the model swapping module 710 may similarly swap AI models 706, 708 back to restore the original functionality of the system 700.

Figure 8:
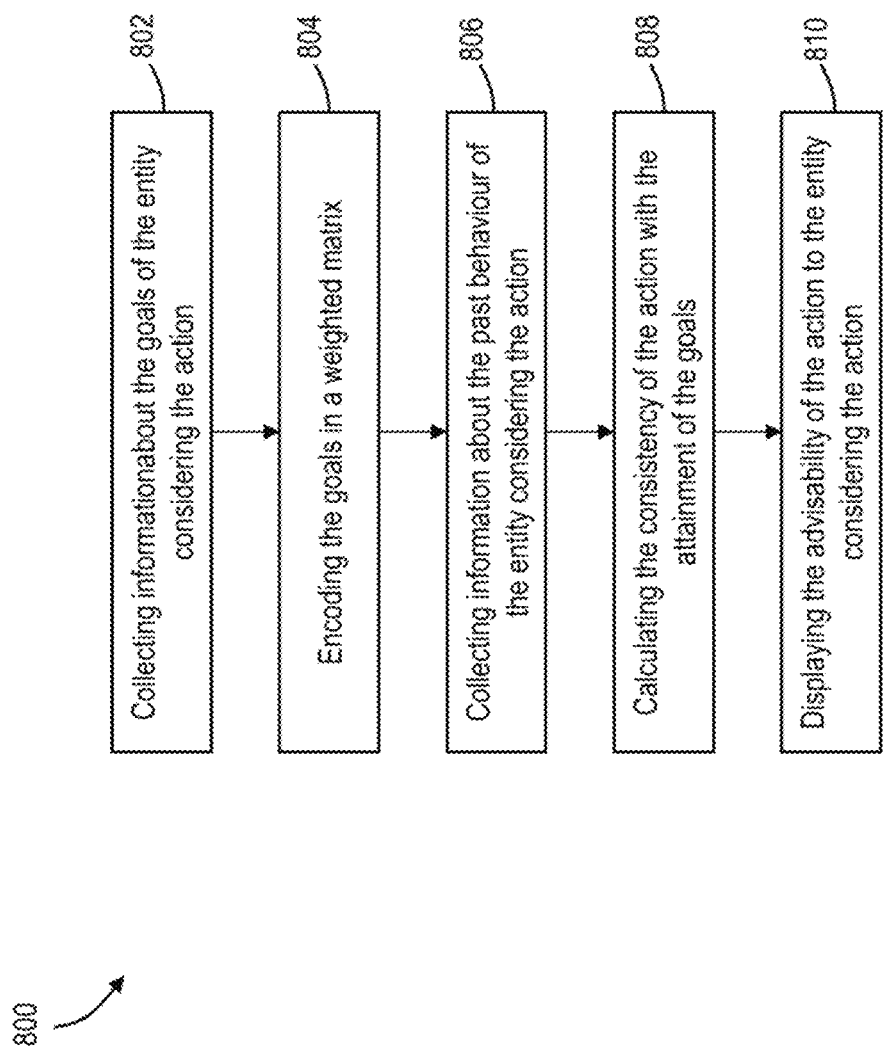
FIG. 8 is a flow diagram of a computer-implemented method of recommending the advisability of an entity's action, according to an embodiment.

Referring now to FIG. 8, shown therein is a method 800 of recommending the advisability of an entity's action, according to an embodiment. The method 800 may be implemented using any of the computer systems or devices described herein, such as system 10 of FIG. 1, system 500 of FIG. 5, or system 600 of FIG. 6.

The entity may be a person. The entity may be a user.

At 802, information about the goals of the entity considering the action are collected. The goals information may be user goals data (e.g. user goal data 307, user goals data 622). The goals information may be collected via a user interface executing at a user device. The goals information may be collected via a programmatic interface, such as an API. The goals information may be collected from a third-party banking or financial management software application.

At 804, the goals represented by the goals information are encoded in a weighted matrix.

At 806, information about past behaviour of the entity considering the action is collected. The past behaviour information (past behaviour data) may be collected similarly to the goals information at 802.

At 808, a consistency of the action with the attainment of the goals represented in the goals information is calculated.

At 810, an advisability of the action is displayed (or otherwise outputted, such as by sound output) to the entity considering the action. The advisability may be displayed in a user interface executing at a user device operated by the entity.

In some cases, after 810, additional actions may be taken to prevent an action that is considered an "unadvisable" action from proceeding.

While the above description provides examples of one or more apparatus, methods, or systems, it will be appreciated that other apparatus, methods, or systems may be within the scope of the claims as interpreted by one of skill in the art.

The invention claimed is:

1. A computer system for generating and providing intelligent recommendations using artificial intelligence ("AI"), the system comprising:
    a memory for storing processor-executable instructions, user feedback data, user resource data representing user resources of a user, and user goal data representing user goals of the user;
    a user interface (UI) configured to receive user input from the user;
    a processor in communication with the memory, the processor configured to execute the processor-executable instructions comprising:
        a first AI model for providing a user-specific graphical presentation of the user interface based on the user feedback data, the user resource data, the user goal data, and user interaction with the user interface, wherein the user-specific graphical presentation of the UI includes user-specific UI elements as determined by a generative code effectiveness learning model;
        a second AI model for selecting user-specific strategy for achieving a financial goal based on the user feedback data, the user resource data, and the user goal data;
            wherein, the first AI model constrains the second AI model based on user-specific inferences of strategies as determined from the user interaction with the user interface;
        a model mapping module configured to implement a functional mapping between the first AI model and the second AI model through which the first AI model and second AI model communicate and mutually update each other, wherein the first and second AI models are in separate domains and similarities between morphologies of a plurality of learned inferences of the user are enforced across the domains, and wherein user-specific inferences are limited using morphologies of at least one user interface workflow that is known to constrain morphologies of at least one subgraph in the second AI model; and
        a user interface generator module for generating a user-specific user interface for outputting the intelligent recommendations, including user-specific UI elements and the user-specific strategy based on the functional mapping between the first AI model and the second AI model, and receiving the user feedback data.

2. The system of claim 1, wherein the first and second AI models are neural networks.

3. The system of claim 1, wherein constraints of each AI model whose data inputs belong to one data domain are learned by the other AI model that processes data in another separate domain.

4. The system of claim 1, wherein the first AI model comprises a convolutional neural network architecture.

5. The system of claim 1, wherein elements of the UI are presented in any one or more of a graphical, text-based, and audio format.

6. The system of claim 1, wherein the code effectiveness learning model is trained as generated UIs are interacted with via the user feedback data and as the second AI model is trained.

7. The system of claim 1, wherein the processor is further configured to execute a model swapping module for replacing the first AI model with a standby AI model during operation.

8. The system of claim 1, wherein the processor is further configured to execute a model swapping module for replacing the second AI model with a standby AI model during operation.

9. The system of claim 1, wherein, in subsequent workflow generation procedures, the output of the UI generator module is made of UI attributes that satisfy the code effectiveness learning model's conditions for effectiveness in a given scenario.

10. The system of claim 1, wherein the first AI model operates in a qualitative domain.

11. The system of claim 10, wherein the qualitative domain is a scenario of user-interface interaction.

12. The system of claim 1, wherein the second AI model operates in a quantitative domain.

13. The system of claim 12, wherein the quantitative domain is financial management.

14. A method for generating and providing an intelligent recommendation using artificial intelligence ("AI"), the method comprising:
    receiving user feedback data, user resource data representing user resources, and user goal data representing user goals;
    providing a user interface ("UI") to interact with the user;
    generating a user-specific user interface using a first AI model, wherein a graphical presentation of the user-specific user interface is based on the user feedback data, the user resource data, the user goal data, and user interaction with the user interface, wherein the user-specific graphical presentation of the UI includes user-specific UI elements as determined by a generative code effectiveness learning model;
    selecting user-specific strategy for achieving a financial goal based on the user feedback data, the user resource data, and the user goal data using a second AI model;
        wherein, the first AI model constrains the second AI model based on user-specific inferences of strategies as determined from the user interaction with the user interface;
    implementing a functional mapping between the first AI model and the second AI model through which the first AI model and second AI model communicate and mutually update each other, wherein the first and second AI models are in separate domains and similarities between morphologies of a plurality of learned inferences of the user are enforced across the domains, and possible-user-specific inferences are limited using morphologies of at least one user interface workflow that is known to constrain morphologies of at least one subgraph in the second AI model; and
    outputting the intelligent recommendation via a user-specific user interface, including user-specific UI elements and the user-specific strategy based on the functional mapping between the first AI model and the second AI model.

15. The method of claim 14, further comprising modelling, via the second AI model, future changes in a state of a user's initial financial assets.

16. The method of claim 14, further comprising generating and presenting a suggestion in the UI preemptively to advise the user about a possible transaction.

17. The method of claim 14, further comprising generating and presenting a suggestion in response to an impending transaction that affects the user resources that the second AI model identifies as useful for the user goals.

18. The method of claim 14, further comprising selecting the recommendation by extracting weights from the second AI model, mapping edges and nodes to workflow steps and decisions, and organizing the edges and nodes in an order reflected by a depth of the nodes in the second AI model.

19. The method of any claim 14, further comprising swapping either the first AI model or the second AI model for a standby AI model during operation.

* * * * *